United States Patent
Eyada

(10) Patent No.: US 10,084,813 B2
(45) Date of Patent: Sep. 25, 2018

(54) INTRUSION PREVENTION AND REMEDY SYSTEM

(71) Applicant: FireEye, Inc., Milpitas, CA (US)

(72) Inventor: Hatem Eyada, Elk Grove, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

(21) Appl. No.: 14/313,934

(22) Filed: Jun. 24, 2014

(65) Prior Publication Data

US 2015/0372980 A1    Dec. 24, 2015

(51) Int. Cl.
*H04L 29/06*    (2006.01)
*G06F 21/57*    (2013.01)

(52) U.S. Cl.
CPC ...... *H04L 63/1441* (2013.01); *H04L 63/1416* (2013.01); *G06F 21/57* (2013.01)

(58) Field of Classification Search
CPC . H04L 63/20; H04L 63/1416; H04L 63/1408; H04L 63/145; H04L 63/0227; H04L 63/1441; G06F 21/10; G06F 21/577
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,440,723 A | 8/1995 | Arnold et al. | |
| 5,490,249 A | 2/1996 | Miller | |
| 5,657,473 A | 8/1997 | Killean et al. | |
| 5,842,002 A | 11/1998 | Schnurer et al. | |
| 5,978,917 A | 11/1999 | Chi | |
| 6,088,803 A | 7/2000 | Tso et al. | |
| 6,094,677 A | 7/2000 | Capek et al. | |
| 6,108,799 A | 8/2000 | Boulay et al. | |
| 6,118,382 A | 9/2000 | Hibbs et al. | |
| 6,269,330 B1 | 7/2001 | Cidon et al. | |
| 6,272,641 B1 | 8/2001 | Ji | |
| 6,279,113 B1 | 8/2001 | Vaidya | |
| 6,298,445 B1 | 10/2001 | Shostack et al. | |

(Continued)

FOREIGN PATENT DOCUMENTS

| | | |
|---|---|---|
| EP | 2106085 A1 | 9/2009 |
| GB | 2439806 A | 1/2008 |

(Continued)

OTHER PUBLICATIONS

Paolo Palumbo, Distributed Sample Anaylsis, GB 1317085.7, Sep. 26, 2013.*

(Continued)

*Primary Examiner* — Matthew Smithers
*Assistant Examiner* — Shaqueal D Wade
(74) *Attorney, Agent, or Firm* — Rutan & Tucker, LLP

(57) ABSTRACT

According to one embodiment, a computerized method is directed to neutralizing callback malware. This method involves intercepting an incoming message from a remote source directed to a compromised endpoint device. Next, a first portion of information within the incoming message is substituted with a second portion of information. The second portion of information is designed to mitigate operability of the callback malware. Thereafter, the modified incoming message, which includes the second portion of the information, is returned to the compromised endpoint device.

26 Claims, 7 Drawing Sheets

(56) References Cited

U.S. PATENT DOCUMENTS

| | | |
|---|---|---|
| 6,357,008 B1 | 3/2002 | Nachenberg |
| 6,417,774 B1 | 7/2002 | Hibbs et al. |
| 6,424,627 B1 | 7/2002 | S.o slashed.rhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |

(56) References Cited

U.S. PATENT DOCUMENTS

| | | |
|---|---|---|
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,869,281 B2 * | 10/2014 | Call .................. H04L 63/1425 726/23 |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,943,594 B1 * | 1/2015 | Arrowood ............... G06F 21/53 726/23 |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |

(56) References Cited

U.S. PATENT DOCUMENTS

| | | |
|---|---|---|
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0128862 A1* | 5/2010 | Vendrow ............... H04M 3/38 379/198 |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0287613 A1 | 11/2010 | Singh et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1* | 4/2011 | Aziz ............... G06F 21/568 726/24 |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2011/0321166 A1 | 12/2011 | Capalik et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0278889 A1 | 11/2012 | El-Moussa |
| 2012/0297489 A1 | 11/2012 | Dequevy |
| 2012/0330801 A1 | 12/2012 | McDougal et al. |
| 2013/0014259 A1 | 1/2013 | Gribble et al. |

(56) References Cited

U.S. PATENT DOCUMENTS

| | | | |
|---|---|---|---|
| 2013/0036472 A1 | 2/2013 | Aziz | |
| 2013/0047257 A1 | 2/2013 | Aziz | |
| 2013/0074185 A1 | 3/2013 | McDougal et al. | |
| 2013/0086684 A1 | 4/2013 | Mohler | |
| 2013/0097699 A1 | 4/2013 | Balupari et al. | |
| 2013/0097706 A1 | 4/2013 | Titonis et al. | |
| 2013/0111587 A1 | 5/2013 | Goel et al. | |
| 2013/0117852 A1 | 5/2013 | Stute | |
| 2013/0117855 A1 | 5/2013 | Kim et al. | |
| 2013/0139264 A1* | 5/2013 | Brinkley | G06F 21/566 726/24 |
| 2013/0160125 A1 | 6/2013 | Likhachev et al. | |
| 2013/0160127 A1 | 6/2013 | Jeong et al. | |
| 2013/0160130 A1 | 6/2013 | Mendelev et al. | |
| 2013/0160131 A1 | 6/2013 | Madou et al. | |
| 2013/0167236 A1 | 6/2013 | Sick | |
| 2013/0174214 A1 | 7/2013 | Duncan | |
| 2013/0185789 A1 | 7/2013 | Hagiwara et al. | |
| 2013/0185795 A1 | 7/2013 | Winn et al. | |
| 2013/0185798 A1 | 7/2013 | Saunders et al. | |
| 2013/0191915 A1 | 7/2013 | Antonakakis et al. | |
| 2013/0196649 A1 | 8/2013 | Paddon et al. | |
| 2013/0227691 A1 | 8/2013 | Aziz et al. | |
| 2013/0246370 A1 | 9/2013 | Bartram et al. | |
| 2013/0263260 A1 | 10/2013 | Mahaffey et al. | |
| 2013/0291109 A1 | 10/2013 | Staniford et al. | |
| 2013/0298243 A1 | 11/2013 | Kumar et al. | |
| 2014/0053260 A1 | 2/2014 | Gupta et al. | |
| 2014/0053261 A1 | 2/2014 | Gupta et al. | |
| 2014/0068775 A1 | 3/2014 | Ward et al. | |
| 2014/0130158 A1 | 5/2014 | Wang et al. | |
| 2014/0137180 A1 | 5/2014 | Lukacs et al. | |
| 2014/0169762 A1 | 6/2014 | Ryu | |
| 2014/0179360 A1 | 6/2014 | Jackson et al. | |
| 2014/0328204 A1 | 11/2014 | Klotsche et al. | |
| 2014/0337836 A1 | 11/2014 | Ismael | |
| 2014/0351935 A1 | 11/2014 | Shao et al. | |
| 2015/0089647 A1* | 3/2015 | Palumbo | H04L 63/145 726/23 |
| 2015/0096025 A1 | 4/2015 | Ismael | |
| 2015/0135317 A1* | 5/2015 | Tock | G06F 21/56 726/23 |
| 2015/0244732 A1* | 8/2015 | Golshan | G06F 21/561 726/24 |

FOREIGN PATENT DOCUMENTS

| | | |
|---|---|---|
| GB | 2490431 A | 10/2012 |
| WO | 02/23805 A2 | 3/2002 |
| WO | 02/006928 A2 | 8/2003 |
| WO | 0206928 | 11/2003 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).

"Packet", Microsoft Computer Dictionary, Microsoft Press, (Mar. 2002), 1 page.

"When Virtual is Better Than Real", IEEEXplore Digital Library, available at, http://ieeexplore.ieee.org/xpl/articleDetails.jsp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

Adobe Systems Incorporated, "PDF 32000-1:2008, Document management—Portable document format—Part1:PDF 1.7", First Edition, Jul. 1, 2008, 756 pages.

AltaVista Advanced Search Results. "attack vector identifier". Http://www.altavista.com/web/results?Itag=ody&pg=aq&aqmode=aqa=Event+Orch- estrator . . . , (Accessed on Sep. 15, 2009).

AltaVista Advanced Search Results. "Event Orchestrator". Http://www.altavista.com/web/results?Itag=ody&pg=aq&aqmode=aqa=Event+Orch- esrator . . . , (Accessed on Sep. 3, 2009).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen").

Cisco "Intrusion Prevention for the Cisco ASA 5500-x Series" Data Sheet (2012).

Cisco, Configuring the Catalyst Switched Port Analyzer (SPAN) ("Cisco"), (1992-2003).

Clark, John, Sylvian Leblanc,and Scott Knight. "Risks associated with usb hardware trojan devices used by insiders." Systems Conference (SysCon), 2011 IEEE International. IEEE, 2011.

Cohen, M.I., "PyFlag—An advanced network forensic framework", Digital investigation 5, Elsevier, (2008), pp. S112-S120.

Costa, M., et al., "Vigilante: End-to-End Containment of Internet Worms", SOSP '05, Association for Computing Machinery, Inc., Brighton U.K., (Oct. 23-26, 2005).

Crandall, J.R., et al., "Minos:Control Data Attack Prevention Orthogonal to Memory Model", 37th International Symposium on Microarchitecture, Portland, Oregon, (Dec. 2004).

Deutsch, P., "Zlib compressed data format specification version 3.3" RFC 1950, (1996).

Distler, "Malware Analysis: An Introduction", SANS Institute InfoSec Reading Room, SANS Institute, (2007).

Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

Excerpt regarding First Printing Date for Merike Kaeo, Designing Network Security ("Kaeo"), (2005).

Filiol, Eric, et al., "Combinatorial Optimisation of Worm Propagation on an Unknown Network", International Journal of Computer Science 2.2 (2007).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Gibler, Clint, et al. AndroidLeaks: automatically detecting potential privacy leaks in android applications on a large scale. Springer Berlin Heidelberg, 2012.

(56) References Cited

OTHER PUBLICATIONS

Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:https://web.archive.org/web/20121022220617/http://www.informationweek- .com/microsofts-honeymonkeys-show-patching-wi/167600716 [retrieved on Sep. 29, 2014].
Heng Yin et al, Panorama: Capturing System-Wide Information Flow for Malware Detection and Analysis, Research Showcase @ CMU, Carnegie Mellon University, 2007.
Hjelmvik, Erik , "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King").
Krasnyansky, Max , et al., Universal TUN/TAP driver, available at https://www.kernel.org/doc/Documentation/networking/tuntap.txt (2002) ("Krasnyansky").
Kreibich, C. , et al., "Honeycomb—Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Leading Colleges Select FireEye to Stop Malware-Related Data Breaches, FireEye Inc., 2009.
Li et al., A VMM—Based System Call Interposition Framework for Program Monitoring, Dec. 2010, IEEE 16th International Conference on Parallel and Distributed Systems, pp. 706-711.
Liljenstam, Michael , et al., "Simulating Realistic Network Traffic for Worm Warning System Design and Testing", Institute for Security Technology studies, Dartmouth College ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].
PCT/US2014/072292 filed Dec. 23, 2014 International Search Report and Written Opinion dated Feb. 23, 2015.
U.S. Appl. No. 14/228,073 filed Mar. 27, 2015 Non-Final Office Action dated Jun. 15, 2015.
U.S. Appl. No. 14/620,055 filed Feb. 11, 2015 Non-Final Office Action dated Jun. 15, 2015.
Marchette, David J., "Computer Intrusion Detection and Network Monitoring: A Statistical Viewpoint", ("Marchette"), (2001).
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Newsome, J. , et al., "Polygraph: Automatically Generating Signatures for Polymorphic Worms", In Proceedings of the IEEE Symposium on Security and Privacy, (May 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
PCT/US2015/037245 filed Jun. 23, 2015 International Search Report and Written Opinion dated Sep. 17, 2015.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Spitzner, Lance , "Honeypots: Tracking Hackers", ("Spizner"), (Sep. 17, 2002).
The Sniffers's Guide to Raw Traffic available at: yuba.stanford.edu/.about.casado/pcap/section1.html, (Jan. 6, 2014).
Thomas H. Ptacek, and Timothy N. Newsham , "Insertion, Evasion, and Denial of Service: Eluding Network Intrusion Detection", Secure Networks, ("Ptacek"), (Jan. 1998).
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul , "NetDetector Captures Intrusions", InfoWorld Issue 27, ("Venezia"), (Jul. 14, 2003).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
EP 15810978.5 filed Jan. 24, 2017 Supplementary European Search Report dated Dec. 18, 2017.

\* cited by examiner

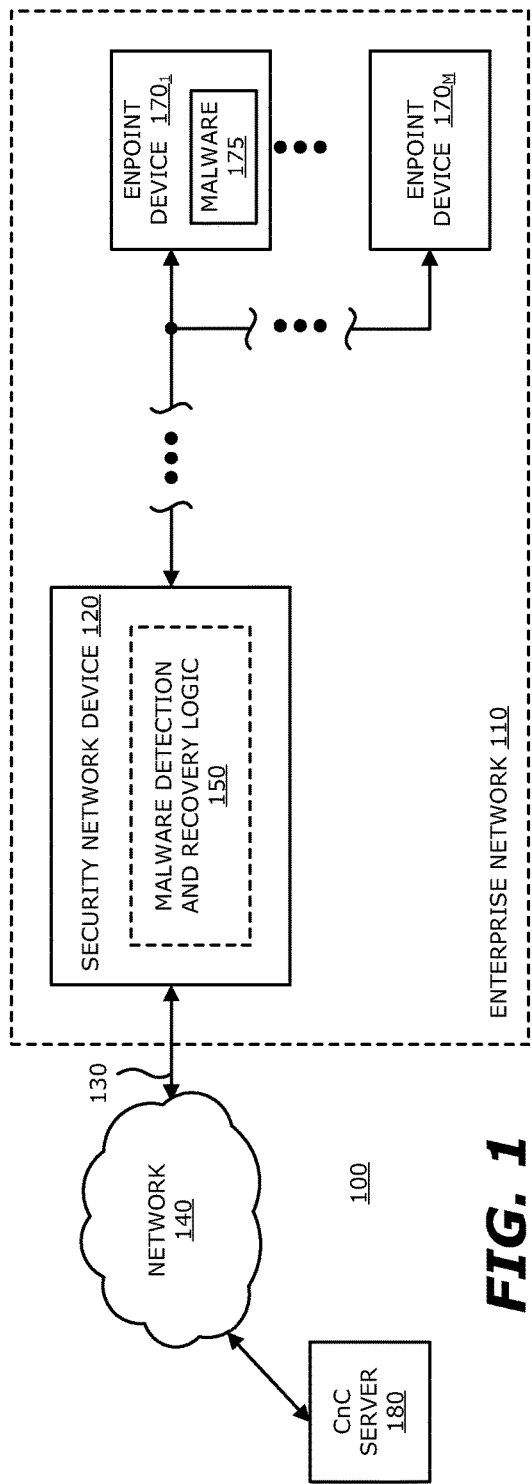
FIG. 1
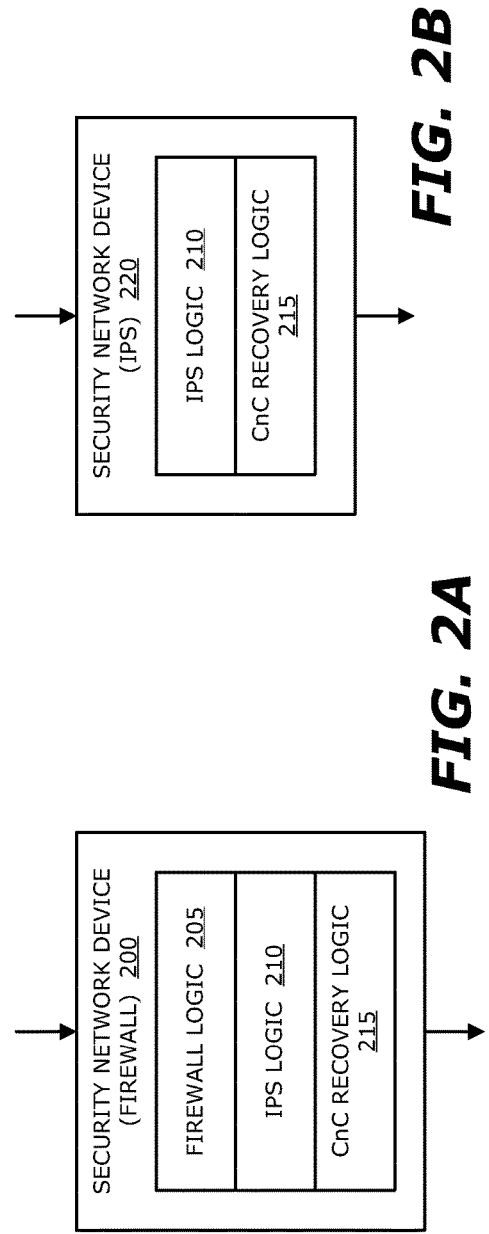
FIG. 2A
FIG. 2B

INTRUSION PREVENTION AND REMEDY SYSTEM

1. FIELD

Embodiments of the disclosure relate to the field of network and cyber security. More specifically, one embodiment of the disclosure relates to a system, device and method for detecting a compromised endpoint device and automatically applying a remedy to mitigate and perhaps eliminate malicious activity by the compromised endpoint device.

2. GENERAL BACKGROUND

Over the last decade, malicious attacks have become a pervasive problem for Internet users as most networked resources include software having vulnerabilities. For instance, over the past few years, more and more vulnerabilities are being discovered in software that is loaded onto network devices, such as vulnerabilities within operating systems for example. While some software vulnerabilities continue to be addressed through software patches, network devices will continue to be targeted for attack in efforts to acquire sensitive information or adversely affect operations of various enterprises.

In general, efforts have been made to counter malicious attacks over web traffic. For instance, a conventional intrusion prevention system (IPS) device may be deployed within an enterprise network in efforts to protect endpoint devices against known attacks. However, conventional IPS devices are unable to protect against unrecognized attacks and are unable to remediate compromised endpoint devices.

Additionally, other types of conventional security system may be deployed in order to detect unrecognized attacks. While capable of detecting unrecognized attack, these conventional security devices are not designed to prevent such attacks from compromising (e.g., infecting) one or more endpoint devices. This creates a gap in the security coverage between identifying the compromised endpoint devices and relying on other means to apply a remedy to halt malicious activity by the compromised endpoint devices.

It is contemplated that, within this gap in security coverage, there is a possibility of a lateral spread of malware, namely the number of compromised endpoint devices may increase within the local network, which would cause more damage to the network and an increase in the amount of time needed to remediate the malware. However, even if malware is promptly remediated, until an appropriate software patch to address the software vulnerability is available and applied, the previously compromised endpoint devices are still susceptible to another malicious attack and reoccurrence of the infection. Hence, there is a need to close this gap in security coverage.

BRIEF DESCRIPTION OF THE DRAWINGS

Embodiments of the invention are illustrated by way of example and not by way of limitation in the figures of the accompanying drawings, in which like references indicate similar elements and in which:

FIG. 1 is an exemplary block diagram of a communication system deploying a security network device.

FIG. 2A is a first exemplary embodiment of the security network device of FIG. 1.

FIG. 2B is a second exemplary embodiment of the security network device of FIG. 1.

DETAILED DESCRIPTION

Figure 2C:
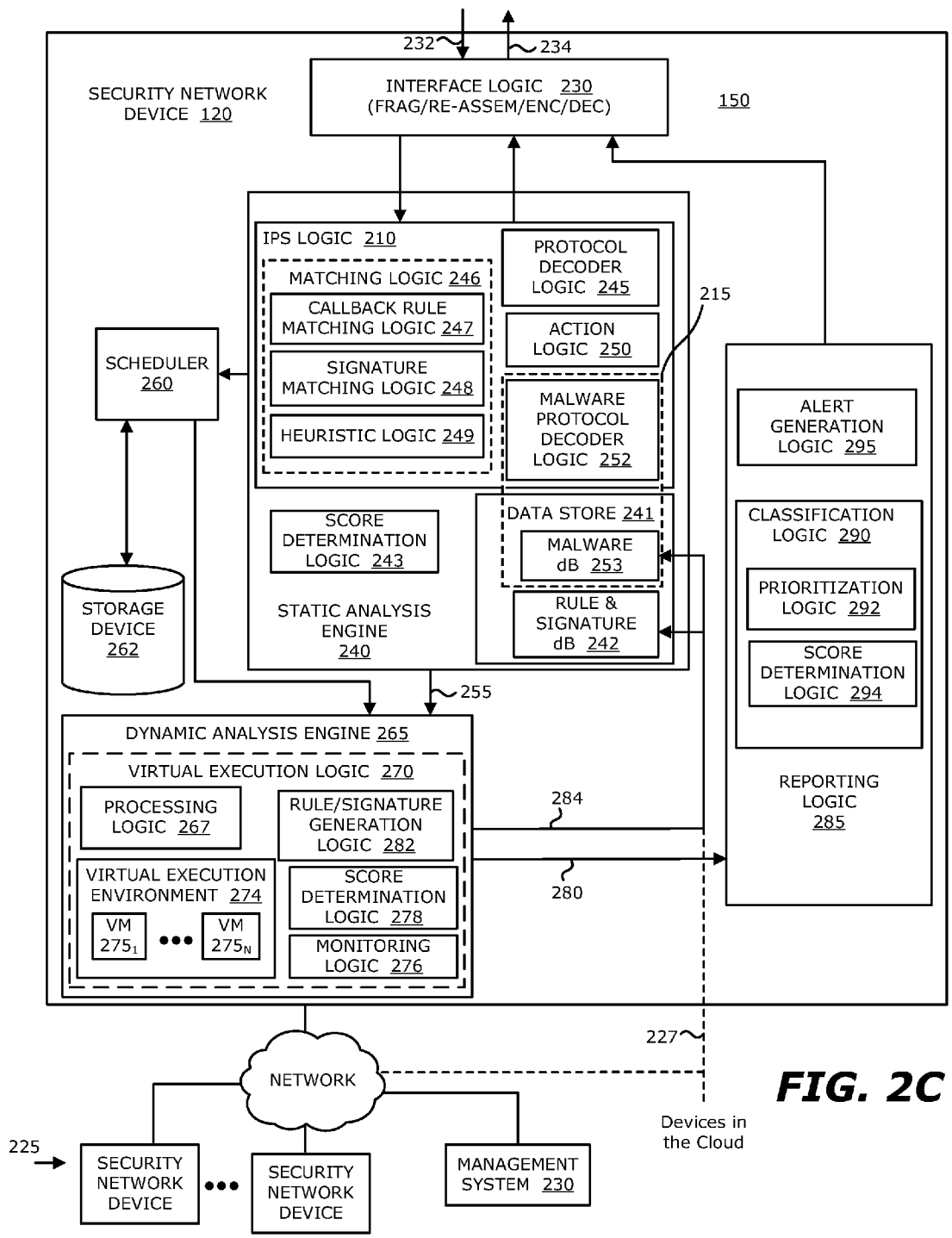
FIG. 2C is a third exemplary embodiment of the security network device of FIG. 1.

Various embodiments of the disclosure relate to one or more electronic devices with network connectivity, referred to as a "security network device" for example, which is responsible for detecting a malicious callback session with a compromised endpoint device, and thereafter, intercepting and/or altering communications between the compromised endpoint device and a targeted Command and Control (CnC) infrastructure such as a CnC server. This embodiment constitutes an improvement to an existing technological process of network-based malware detection.

In general, callbacks may be construed as outbound communications initiated by malware, which has already gained access to and installed itself within a network device (host). A callback is directed to a cyber attacker's server or other CnC infrastructure. Typically, the callback message is transmitted over a CnC channel established between the compromised device and the CnC server using Hypertext Transfer Protocol (HTTP), Simple Mail Transfer Protocol (SMTP) or other widely utilized protocol. The callback may seek instructions from the CnC server, such as commands to identify and exfiltrate specific data (e.g., specific intellectual property or sensitive information such as military secrets) over the same CnC channel or another channel identified in the response to the callback.

The callback may be part of a single phase attack such as that just described entailing a callback from an installed malware ("callback malware"), receipt of instructions in the reply, and the perpetration of malicious activity, though this can be also thought of as having a CnC phase and an exploit phase. A callback may also be part of a more complex multi-phase attack, often a targeted Advanced Persistent Threat (APT). The multi-phase attack may be designed to accomplish a specific set of malicious objectives and may include, for example, an initial malware kit, callback message/reply, and a secondary malware payload delivery to the compromised device.

For instance, a multi-phase attack may include: (i) an often-small malware kit infiltrating (accessing) a network device (initial exploit); (ii) sending the callback message to obtain instructions from the CnC server, where the instructions may specify, e.g., parameters for a subsequent communication session; (iii) downloading (whether in the same communication session as the callback message (callback session) or in a second communication session) a secondary, often more sophisticated malware package designed with a larger payload and often with detection evasion capabilities;

and (iv) the second malware package executing within the compromised device. The secondary malware package may perform any of a variety of nefarious activities, such as unauthorized accessing of databases, file shares and other computing resources, even those offline at the time of the original exploit; exfiltrating (sending) data from the compromised device or from another computing resource accessible by that device; infecting other devices within the proprietary network to which the malware has gained access; or opening backdoors into the proprietary network without detection by establishing a long-term foothold within (and covert point of entry into/exit from) the device/ network.

Most enterprise networks focus security efforts on intrusion detection for unauthorized inbound traffic. Outbound communications including callbacks originating from within their proprietary network are often allowed, as are subsequent inbound response messages. Consequently, unauthorized outbound communications such as callbacks originating within the proprietary network from malware and callback responses (CnC commands) often go undetected even though detecting callback activity is strong evidence of a callback-based attack and malware-compromised devices.

Some more advanced malware detection systems, such as those available from FireEye, Inc. of Milpitas, Calif., can detect and report callbacks, but without an ability to conduct recovery by neutralizing the malware, as described above.

According to one embodiment of the disclosure, CnC recovery logic implemented within an Intrusion Prevention System (IPS) device is configured to intercept and alter these communications in efforts to neutralize malware currently installed on the compromised endpoint device. For example, portions of incoming network traffic are compared to callback rules (and/or signatures) as described below. In response to detecting a malicious callback session, namely at least one portion of the network traffic matches one of the callback signatures and/or violates one or more callback rules, the CnC recovery logic may be configured to drop incoming packets from the CnC server that are directed to the compromised endpoint device. At that time, the CnC recovery logic operates as the CnC server for communications with the compromised endpoint device in efforts to upload a neutralized version of at least a portion of malware that is currently loaded on the compromised endpoint device and is responsible for establishing the malicious callback session.

Herein, the neutralized version of the malware is adapted to mitigate (e.g., reduce, obstruct, lessens functionality, etc.) or eliminate operability of the malware, most notably the malicious activity that is intended to harm resources associated with the endpoint device or attack other endpoint devices. This neutralized malware can safely reside on the compromised endpoint device until the malware has been identified and remediated and/or a software patch can be applied to the compromised endpoint device immediately after remediation to address the vulnerability and prevent future infections.

More specifically, according to one embodiment of the disclosure, a security network device may be deployed within an enterprise network to monitor network traffic propagating over the network. The security network device is configured to detect the presence of malware, notably callback malware, and generate signatures (e.g., pre-configured and predetermined attack patterns) or callback rules that are used to detect a subsequent callback session controlled by the malware. Hence, detection of a potential malicious callback-based attack may occur prior to or upon receipt of a callback message from a compromised endpoint device.

Implemented within the security network device, malware detection and recovery logic is adapted to detect malicious activity, such as initiation of a callback message or a response to the callback message during a malicious callback session for example, through analysis of objects forming part of the network traffic without executing these objects. This analysis, sometimes referred to as "static analysis" may include comparison of content of the objects with signatures (e.g., pre-configured and predetermined attack patterns) or detection of callback rule violations. Upon detection of a malicious callback session, CnC recovery logic within the malware detection and recovery logic is activated to alter communications from the CnC server in efforts to install neutralized software onto the compromised endpoint device. In general, the "neutralized" software may include code that overwrites at least part of the callback malware and causes the callback malware to become inoperable or mitigate its operability.

As a first illustrative example of an inventive aspect of the disclosure, during virtual machine (VM) based analysis of portions of the network traffic, the presence of malware associated with a malicious callback-based attack within network traffic directed to one or more endpoint devices may be detected. In addition to detecting the presence of the callback malware by monitoring for anomalous behaviors during VM execution of certain objects within the network traffic, the malware detection and recovery logic may be configured to identify the particular CnC communication code associated with the malicious callback-based attack, a particular address (or host name) of the CnC server, the targeted endpoint devices (hereinafter, "compromised endpoint device(s)") and/or other information that could assist in the generation of one or more callback rules (and/or signatures) that may be used in detecting subsequent callback messages produced by the callback malware.

For instance, upon detection of malware associated with a malicious callback-based attack, the malware detection and recovery logic may conduct an additional analysis to uncover and subsequently extract authentication information in that malware object, such as keys and/or a certificate chain for example. In the case of lateral movement, where that malware object is intended to be used on a newly compromised CnC server, the authentication information can be used by the malware detection and recovery logic to establish secure communications with the compromised endpoint device. The authentication information may be saved as part of a neutralized malware database, where neutralized software is associated with its corresponding authentication information, where applicable. Of course, the authentication information may also be obtained by means other than the malware detection and recovery logic such as through a web crawler and/or offline research.

Herein, information associated with the detected malware may be converted into one or more signatures (referred to herein as "callback signatures"). Thereafter, in response to the malware detection and recovery logic detecting a subsequent callback message associated with the callback malware (or produced from any of the compromised endpoint device(s)), where a portion of the network traffic matches at least one of the callback signatures, the CnC recovery logic is activated to disregard returned information from the CnC server (if the callback message was not halted). Additionally, the CnC recovery logic provides signaling that causes the compromised endpoint device(s) to overwrite the previously identified CnC communication software with "neutralized" software.

According to one embodiment of the disclosure, the neutralized software may be represented as a code update that, upon overwriting at least part of the callback malware, (i) removes its current callback identifier (e.g., callback Internet Protocol "IP" address, callback phone number, etc.), (ii) substitutes a previous callback identifier with a new callback identifier that is directed to another type of security network device or directed to an entity that handles malware remediation, and/or (iii) resets a callback time (e.g., weeks, months or years from the current time) in order to allow a software patch to be generated and installed in the interim and avoid further infections by this callback malware. Also, as one or more of the VMs detected the presence of the malware, the neutralized software may be provided to the VM(s) to determine whether this code will operate effectively to mitigate or eliminate further malicious activity (e.g., anomalous events) before it is provided to the actual compromised endpoint device(s).

As another illustrative example, the malware detection and recovery logic may detect a callback message from an endpoint device without prior detection of the presence of the callback malware within network traffic previously routed to that endpoint device. In this case, the malware detection and recovery logic may verify that the callback message does not match any callback signatures or violate any prescribed callback rules (e.g., provide information from certain registry keys and/or secured storage, etc.). As the callback appears to comply with authorized callbacks (e.g., transmission to trusted servers such as Microsoft®-controlled server, not a transmission to a known untrusted website, etc.), the malware detection and recovery logic does not impede such communications.

It is contemplated that, sometimes, malware associated with a callback-based attack may go undetected by the security network device due to traffic overflow at peak times, deploying the security network device after the endpoint device has been compromised, or the like. In such cases, the security network device may or may not immediately detect a particular malicious (CnC) callback-based attack as described above. To address this security gap, the security network device may actively scan memory of potentially compromised endpoint devices in an attempt to uncover callback malware.

In particular, the security network device may scan memory of one or more selected endpoint devices to determine whether the scanned memory includes one or more suspicious objects, and if so, conduct VM-based analysis on the suspicious objects. If the VM-based analysis verifies that the suspicious objects are associated with a malicious callback-based attack, one or more callback rules (and/or signatures) may be generated and the CnC recovery logic is activated upon detection of a callback message that matches the callback rule and/or signature (and is associated with the malicious callback-based attack).

In case of encrypted sessions, it may not be possible to activate the CnC recovery logic in the middle of a communication session with the CnC server, but a compromised endpoint device identifier (e.g., Media Access Control "MAC" address, host name, IP address, etc.) may be saved in a remedy list within a data store. Thereafter, the CnC recovery logic is activated on the next communication session between the compromised endpoint device and the CnC server as long as the CnC server credentials are available.

I. TERMINOLOGY

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but is not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

As broadly construed, "malware" is any malfunctioning or malicious software, namely information (e.g., code, script, etc.) which, when executed, harms or co-opt operations of an electronic device communicatively coupled to a network (hereinafter, "endpoint device") or misappropriate, modify or delete stored data.

The term "object" generally refers to a collection of data, such as a group of related packets associated with a request-response message pairing for example, normally having a logical structure or organization that enables classification for purposes of analysis. For instance, an object may be a self-contained element, where different types of such objects may include an executable file, non-executable file (such as a document or a dynamically link library), a Portable Document Format (PDF) file, a JavaScript file, Zip file, a Flash file, a document (for example, a Microsoft® Office® document, Word® document, etc.), an electronic mail (email), downloaded web page, and/or an instant message accordance with Session Initiation Protocol (SIP) or another messaging protocol.

The term "flow" generally refers to a collection of related objects (e.g., messages), communicated during a single communication session between a source network device (e.g., endpoint device) and a destination network device (e.g., server). For instance, a first flow (e.g., HTTP request messages such as a HTTP GET message or a HTTP POST message) may be user initiated while subsequent flows (e.g., HTTP response messages or other messages to complete the communication sessions) may be initiated automatically without user intervention.

A "communication session" may be defined as a semi-permanent information exchange between source and destination network devices. For example, the communication session may be in accordance with protocols at the application layer (e.g., HTTP), session layer, or transport layer (e.g., Transmission Control Protocol "TCP") of the Open Systems Interconnection (OSI) model.

A "message" generally refers to information transmitted as information in a prescribed format, where each message may be in the form of one or more packets, frames, HTTP-based transmissions, or any other series of bits having the prescribed format.

The term "transmission medium" is a physical or logical communication path between two or more electronic devices (e.g., any devices with data processing and network connectivity such as, for example, a server, a mainframe, a computer such as a desktop or laptop, netbook, tablet, firewall, smart phone, router, switch, bridge, etc.). For instance, the communication path may include wired and/or wireless segments, and/or shared memory locations. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware. Also, the term "match" generally describes that a certain level of comparison has been successfully achieved.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. EXEMPLARY ARCHITECTURES

Referring to FIG. 1, an exemplary block diagram of a communication system 100 deploying a security network device 120 is shown. The security network device 120 is deployed within an enterprise network 110 and adapted to analyze information associated with network traffic 130 received via a communication network 140. The communication network 140 may include a public network such as the Internet, in which case one or more network devices, such as a firewall for example, may be positioned in-front of the security network device 120. Alternatively, the communication network 140 may be a private network such as a wireless data telecommunication network, wide area network, a type of local area network (LAN), or a combination of networks.

According to one embodiment of the disclosure, security network device 120 comprises malware detection and recovery logic 150, which is configured to detect whether portions of network traffic directed to one or more endpoint devices $170_1$-$170_M$ (M≥1) is associated with a malicious attack. For instance, malware 175 may be embedded or may be included within network traffic that is routed to at least one endpoint device (e.g., endpoint device $170_1$), where the malware 175 may be a callback routine that initiates a callback message to a designated server 180, namely a Command and Control (CnC) server (sometimes referred to as "callback malware"). Normally, such communications by the compromised endpoint device $170_1$ prompt the CnC server 180 to return information to the callback malware 175, such as commands or code updates for example, which may cause the compromised endpoint device $170_1$ to exfiltrate sensitive information and/or evade detection.

Hence, besides detecting a malicious attack such as a callback message from an endpoint device that is deemed "compromised", the malware detection and recovery logic 150 is further configured to intercept returned information from the CnC server 180, and substitute the returned information with information that will neutralize the malware 175. This information may include software that is devised to preclude or mitigate further malicious activities initiated by the malware 175.

Referring now to FIG. 2A, a first exemplary embodiment of the security network device 120 is shown. Herein, the security network device 120 is represented as a firewall 200, namely a system designed to prevent unauthorized access to or from network 140 of FIG. 1. Herein, the firewall 200 comprises firewall logic 205 that examines network traffic entering and/or leaving the enterprise (or private) network 110 and blocks traffic that does not satisfy specific security criteria (e.g., certain prescribed rules of operation, matched passwords, matched keying material, etc.).

Firewall 200 further comprises intrusion protection system (IPS) logic 210 and the CnC recovery logic 215. Herein, the IPS logic 210 conducts at least callback rule matching operations on objects under analysis that are extracted from monitored network traffic in order to identify whether characteristics of any of these objects are indicative of an exploit and associated with malware. In general, callback rule matching includes a determination as to whether contents associated with an object under analysis comply with stored callback rules, which may be accomplished, at least in part, through signature matching. In particular, the contents associated with the object under analysis may be compared to callback signatures that include information associated with a known malicious callback session. For instance, the callback signatures may identify one or more IP addresses, specific protocol headers, certain patterns with respect to content, message formatting, and/or communications protocols that have been previously determined to be malicious.

The CnC recovery logic 215 may be implemented as part of IPS logic 210 or may be logic separate from the IPS logic 210. Herein, the CnC recovery logic 215 is adapted to, in response to detecting a callback from a compromised endpoint device (e.g., endpoint device $170_1$), overwrite the corresponding CnC communication code previously uncovered by the VM-based analysis with "neutralized" software. The neutralized software is configured to mitigate or eliminate operability of the malware 175 currently existing on the compromised endpoint device. Of course, in lieu of overwriting, it is contemplated that the neutralized software may be added to the malware 175 where, upon operation, mitigates operability of the malware 175.

As described above, the neutralized software may be configured to mitigate or eliminate further malicious activity conducted by the malware 175. This may be accomplished by the neutralized software precluding further callbacks by assigning a different callback identifier (e.g., an IP address assigned to the security network device or directed to an entity that handles malware remediation) or removing the callback identifier from the malicious CnC communication code altogether. As another example, the neutralized software may set a callback time to a date that is weeks, months or even years from the current time, which provides a substantial amount of time for a software patch to be developed to address the software vulnerability used to surreptitiously load the callback malware into the compromised endpoint device $170_1$.

Referring to FIG. 2B, a second exemplary embodiment of the security network device 120 is shown. Herein, the security network device is represented as a separate IPS device 220, namely a stand-alone device that is designed to prevent unauthorized access to or from network 140 of FIG. 1. As shown, the IPS 220 comprises the IPS logic 210 and the CnC recovery logic 215, where the operations of the IPS logic 210 and the CnC recovery logic 215 are described above.

Referring now to FIG. 2C, a third exemplary embodiment of the security network device 120 is shown. Herein, the security network device 120 is represented with IPS functionality, as well as an ability to perform static and/or dynamic analysis of objects associated with network traffic in order to detect a malicious callback message and to temporarily remediate the callback-based attack through a neutralized software update. Herein, the security network device 120 is one of a plurality of security network devices 225 that are geographically distributed from each other and communicatively coupled to a management system 230. The geographic distribution of the security network devices 225 may provide scalability to support growth of the enterprise network 110 and increased intelligence as to different exploits and/or malware that are detected through the system in order to formulate a collective blacklist that takes into account malicious CnC servers detected by other security network devices as well as callback rules and/or callback signatures detected by other communication systems.

Referring still to FIG. 2C, the management system 230 may be adapted to manage the security network devices 225, including security network device 120. For instance, the management system 230 may be responsible for updating software executed by one or more hardware processors within the security network device 120. Such updating may be conducted automatically or conducted manually via uploads by a network security personnel. Also, such updating may be conducted freely among the security network devices 225 or subject to a service subscription.

Herein, the security network device 120 comprises malware detection and recovery logic 150, which includes interface logic 230, a static analysis engine 240, a scheduler 260, a data store 262, a dynamic analysis engine 265 and/or reporting logic 285. Herein, the interface logic 230 is configured to receive incoming network traffic 232 and to conduct defragmentation, re-assembly and re-ordering operations, where the network traffic 232 is fragmented and received out-of-order. The defragmentation, re-assembly and re-ordering operations are conducted to properly segment messages (e.g., packets) associated with the network traffic 232 for subsequent analysis. Furthermore, where the incoming network traffic 232 is encrypted, the interface logic 230 may be configured with cryptographic logic to decrypt the incoming network traffic 232 and re-encrypt outgoing network traffic 234 in accordance with the same cryptographic scheme. It is contemplated that the some or all of the above-described functionality (e.g., defragmentation, re-assembly, re-ordering, decryption and/or re-encryption) may be conducted by the IPS logic 210 in lieu of interface logic 230.

As further shown in FIG. 2C, the static analysis engine 240 is configured to analyze characteristics of objects associated with the network traffic 232. In particular, the static analysis engine 240 may include one or more software modules that, when executed by one or more hardware processors located within the security network device 120, operate as a filter that (i) parses the incoming network traffic, (ii) aggregates and analyzes information associated with characteristics of the network traffic from the same source for a given communication session, and (iii) optionally stores information associated with the characteristics within the data store 241.

More specifically, static analysis engine 240 may be configured with IPS logic 210 that includes a protocol decoder logic 245, matching logic 246 and action logic 250. Herein, according to one embodiment of the disclosure, the protocol decoder logic 245 parses incoming messages received from the interface logic 230, namely messages that have undergone defragmentation, re-assembly, re-ordering and/or decryption, and processes these messages in accordance with their protocol. For example, where the incoming messages are HTTP packets, the protocol decoder logic 245 analyzes the HTTP headers associated with these HTTP packets, and thereafter, saves information associated with the HTTP header in a particular context (e.g., selected memory structure). It is contemplated that the saved information associated with the HTTP headers may undergo normalization to generate normalized results having the same or a compatible with the callback rules and/or signatures within a database 242 for comparison purposes, as described below.

According to one embodiment of the disclosure, the matching logic 246 includes at least callback rule matching logic 247 and callback signature matching logic 248. The callback rule matching logic 247 first identifies whether an object under analysis (e.g., one or more related packets in a flow) is associated with a callback message from an endpoint device. If so, the callback rule matching logic 247 determines whether contents of the callback message violate stored callback rules, where the rules are used to identify one or more callback messages (e.g. certain information such as patterns, formatting and/or communications protocols) that originated from previously detected callback malware. The callback rules are uploaded into database 242 from at least the dynamic analysis engine 265, from other security network devices 225, from the management system 230, and/or from electronic devices operating in the cloud, as represented in dashed lines by communication path 227.

Despite the callback rule matching logic 247 failing to detect that the object under analysis is associated with a malicious callback-based attack in accordance with pre-stored callback rules, signature matching logic 248 and heuristic logic 249 may conduct further static analysis of the object under analysis. Also, memory of the potentially compromised endpoint device may be scanned as described above in FIG. 7. It is contemplated that the CnC recovery logic 215, namely malware protocol decoder logic 252 capable of accessing malware database 253, is inactive based on the lack of detection that a malicious callback-based attack has occurred.

Herein, signature matching logic 248 is adapted to perform signature checks on objects associated with network traffic, normally from an external source. Some of these signature checks include callback signature checks and perhaps exploit (or vulnerability) signature checks. A callback signature check is a process that compares an object under analysis against one or more pre-stored callback signatures (e.g., pre-configured and predetermined callback-based attack patterns) stored within a rule/signature database 242 within data store 241. Each exploit callback signature may include information directed to a previously detected or known attack pattern such as IP address(es) or host name(s)

associated with known CnC servers, certain patterns of communication indicative of a callback, or the like.

Additionally, signature matching logic 248 may include exploit signature check, which is a process that compares the object under analysis against one or more pre-stored exploit signatures stored within a rule/signature database 242 within data store 241. In general, each exploit signature may include information directed to a previously detected or known attack pattern that may be different from known callback-based attack patterns. This additional analysis may be useful in subsequent determination of the presence of callback malware, especially where the attack patterns operate in combination with malicious callback-based attacks or as a precursor to callback-based attacks.

Heuristic logic 249 may be adapted for analysis of certain portions of an object to determine whether any portion is "suspicious," normally when the object is not initially determined by the callback rule matching logic 247 or signature matching logic 248 as being associated with a malicious callback-based attack. The object may be suspicious if the object includes (i) a particular Uniform Resource Locator (URL) that is associated with known exploits, (ii) a particular source or destination address (e.g., IP addresses, Media Access Control "MAC" addresses, etc.) that is associated with known exploits, (iii) a particular exploit pattern; or (iv) other types of malicious data.

In response to detecting that the object under analysis is associated with a callback process, but is unable to verify that the callback process is malicious by matching at least one callback rule (or signature), the action logic 250 may be configured to (i) allow the callback process to continue or (ii) drop packets associated with the object under analysis and send a Reset message to the source and destination to close its communication session. However, upon detecting that the object under analysis is associated with a malicious callback-based attack, namely the object under analysis violates at least one prescribed callback rule or matches at least one callback signature that signifies a malicious callback event has occurred, the action logic 250 activates the CnC recovery logic 215. In particular, the action logic 250 activates the malware protocol decoder logic 252 that handles packet dropping and downloading of code to neutralize the callback malware. Additionally, both the protocol decoder logic 245 and the matching logic 246 may be deactivated for the remainder of this particular communication session.

Operating in combination with at least signature matching logic 248 and/or heuristic logic 249, a score determination logic 243 may be configured to generate a score value that represents a probability (or level of confidence) that the object under analysis is associated with a malicious attack. For instance, the "static score value" may be based, at least in part, on (i) pattern matches by the IPS logic 210; (ii) heuristic or determinative analysis results; and/or (iii) analyzed deviations in messaging practices set forth in applicable communication protocols (e.g., HTTP, TCP, etc.) through the presence of a callback message for example. Where the score exceeds a prescribed value (e.g., 9 out of 10), the object under analysis is deemed "suspicious". The static analysis score and/or other results from the static analysis (hereinafter "static analysis results") may be provided to classification logic 290 for classification of a suspicious object.

After analysis of that the object, which has not been identified as part of a malicious callback-based attack, the static analysis engine 240 may route one or more "suspicious" objects (e.g., suspicious object 255) to the dynamic analysis engine 265, which is configured to provide more in-depth analysis by analyzing the behavior of the suspicious object 255 in a VM-based operating environment. Although not shown, the suspicious object 255 may be buffered by a data store until ready for processing by virtual execution logic 270.

More specifically, after analysis of the characteristics of the suspicious object 255 has been completed, the static analysis engine 240 may provide some or all of the suspicious object 255 to the dynamic analysis engine 265 for in-depth dynamic analysis by one or more virtual machines (VMs) $275_1$-$275_N$ (N≥1) of the virtual execution logic 270. For instance, the virtual execution logic 270, operating in combination with processing logic 267 (described below), is adapted to simulate the transmission and/or receipt of signaling by a destination device represented by VM $275_1$. Of course, if the object under analysis is not suspected of being part of a malicious attack, the static analysis engine 240 may simply denote that the object is benign and refrain from passing the object to the dynamic analysis engine 265 for analysis.

According to one embodiment, the scheduler 260 may be adapted to configure the VMs $275_1$-$275_N$ based on metadata associated with the flow received by the static analysis engine 240. For instance, the VMs $275_1$-$275_N$ may be configured with software profiles corresponding to the software images stored within storage device 262. As an alternative embodiment, the VMs $275_1$-$275_N$ may be configured according to one or more software configurations that are being used by electronic devices connected to a particular enterprise network (e.g., endpoint devices) or prevalent types of software configurations (e.g., a Windows® 7 OS; Internet Explorer® (ver. 10) web browser; Adobe® PDF™ reader application). As yet another alternative embodiment, the VMs $275_1$-$275_N$ may be configured to support concurrent virtual execution of a variety of different software configurations in efforts to verify that the suspicious object is part of a malicious attack (e.g., reconnaissance operations, entry-point testing, exploit, etc.). Of course, it is contemplated that the VM configuration described above may be handled by logic other than the scheduler 260.

According to one embodiment of the disclosure, the dynamic analysis engine 265 is adapted to execute one or more VMs $275_1$-$275_N$ to simulate the receipt and execution of content associated with the suspicious object 255 within a run-time environment as expected by the type of object. For instance, dynamic analysis engine 265 may optionally include processing logic 267 to provide anticipated signaling to the VM(s) $275_1$, . . . , and/or $275_N$ during virtual processing.

For example, the processing logic 267 may be adapted to provide, and sometimes modify (e.g., modify IP address, etc.) packets associated with the suspicious object 255 in order to control return signaling back to the virtual execution environment 274. Hence, the processing logic 267 may suppress (e.g., discard) the return network traffic so that the return network traffic 234 is not transmitted to the communication network 236. According to one embodiment of the disclosure, for a particular suspicious object 255 being multiple related flows such as TCP or UDP flows, the processing logic 267 may be configured to send packets to the virtual execution environment 274 via a TCP connection or UDP session. Furthermore, the processing logic 267 synchronizes return network traffic by terminating the TCP connection or UDP session.

As further shown in FIG. 2C, the monitoring logic 276 within the virtual execution logic 270 may be configured to monitor behaviors of one or more VMs 275$_1$, ..., and/or 275$_N$, such as VM 275$_1$ that is responsible for executing the suspicious object 255. This monitoring is conducted to detect anomalous activity indicative that the suspicious object 255 is part of a malicious attack. When anomalous activity is detected, the monitoring logic 276 operating with an optional score determination logic 278 may route the VM-based results 280 (e.g., computed score, information associated with the detected anomalous behaviors, and other information associated with the detected malicious activity by the suspicious object 255) to reporting logic 285.

Additionally, some or all of the anomalous behaviors detected by monitoring logic 276 may be routed to rule/signature generation logic 282, which produces rules and/or signatures for subsequent detection of objects associated with the same type of malicious attack. For instance, during virtual execution of the suspicious object and upon detecting by the monitoring logic 276 of one or more callback messages attempting to establish communications with a CnC server, the rule/signature generation logic 282 generates one or more callback rules and/or callback signatures that would enable the IPS logic 210 to detect a callback message associated with that particular callback-based attack. Furthermore, the rule/signature generation logic 282 may be adapted to generate code that is configured to "neutralize" the callback malware associated with the callback-based attack. Of course, it is contemplated that the code may alternatively be generated outside the security network device 120 and subsequently uploaded into the malware database 253 from another security network device 225, from the management system 230, or via a third party from the cloud.

It is noted that the score determination logic 278 may not be implemented within the dynamic analysis engine 265 so that the VM-based results 280 exclude any scores, but rather includes information associated with the detected anomalous behaviors that are analyzed by the monitoring logic 276. The VM-based results 280 are subsequently weighted by the prioritization logic 292 and analyzed by the score determination logic 294 implemented within the classification engine 290.

According to one embodiment of the disclosure, the classification logic 290 may be configured to receive the static analysis results and/or the VM-based results 280. According to one embodiment of the disclosure, the classification logic 290 comprises prioritization logic 292 and score determination logic 294. The prioritization logic 292 may be configured to apply weighting to results provided from dynamic analysis engine 265 and/or static analysis engine 240. These results may include (1) a "dynamic analysis score" produced by score determination logic 294 and/or "static analysis score" produced by score determination logic 294 or (2) anomalous behaviors detected by monitoring logic 276.

The score determination logic 294 comprises one or more software modules that are used to determine a final probability as to whether the suspicious object is part of a malicious attack, and the resultant (final) score representative of this final probability may be included as part of results provided to alert/report generation logic 295 within reporting logic 285. Where the final score exceeds a reporting threshold, the alert/report generation logic 295 generates an alert to security personnel. For instance, with respect to detection of callback malware, the security personnel may increase their scrutiny with respect to callback communications involving particular endpoint device(s) that may have received the callback malware. For instance, callback messages from a particular endpoint device, such as a chief financial officer's endpoint device, may trigger an alert to the security personnel.

Where the score determination logic 294 has failed to determine that the suspicious object 255 is malicious based on the static analysis results and/or the VM-based results 280 (e.g., dynamic analysis score, etc.), the classification engine 290 may refrain from providing the results to alert/report generation logic 295 or the results can be provided to alert/report generation logic 295 for processing to denote no malicious attack has been detected.

Figure 3:
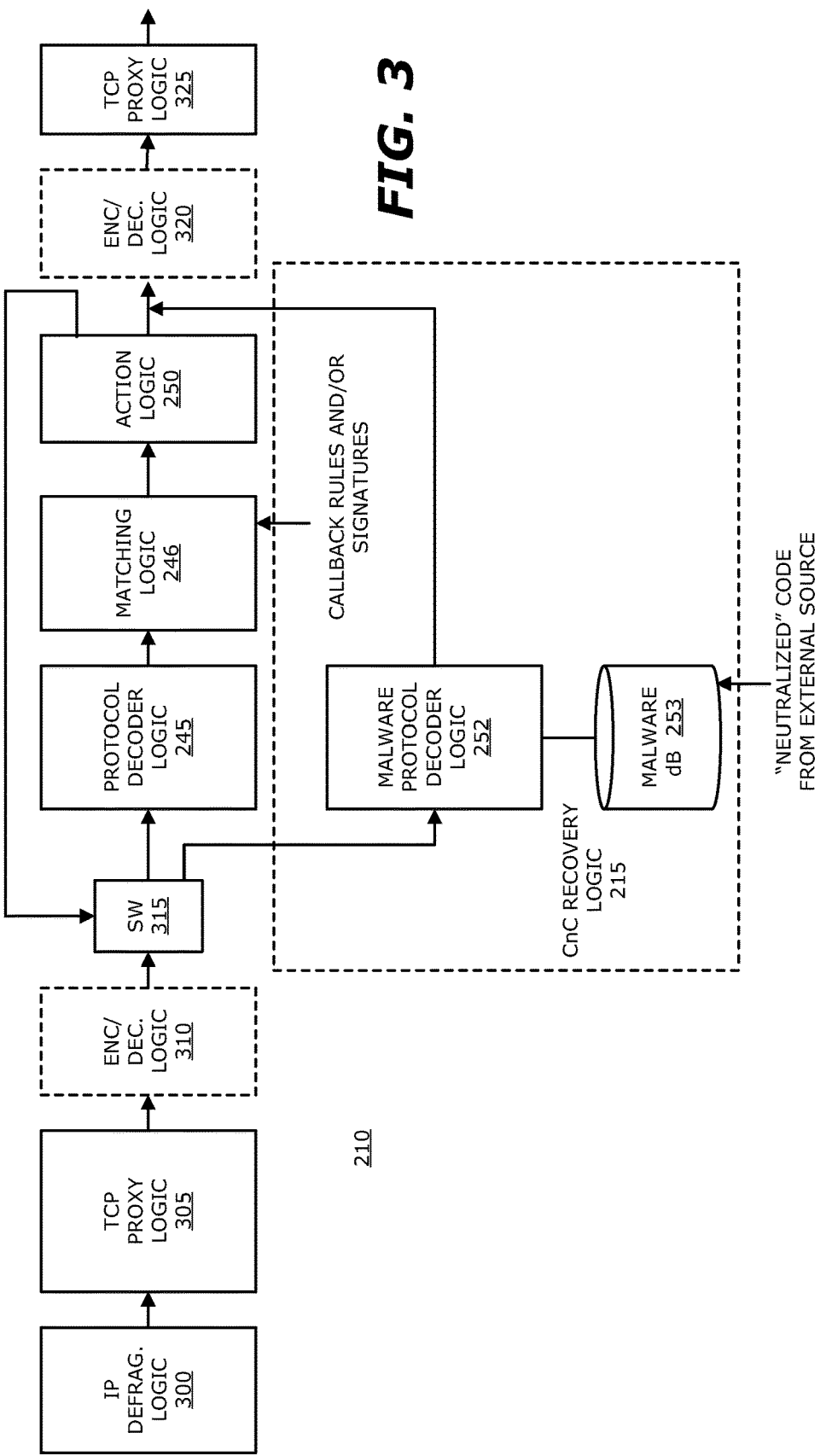
FIG. 3 is an exemplary block diagram of an operation flow for the IPS logic of FIG. 2C that is part of malware detection and recovery.

Referring to FIG. 3, an exemplary block diagram of an operation flow for the IPS logic 210 that is part of malware detection and recovery is shown, where activation of the CnC recovery logic 215 is triggered by detection of a malicious callback message. According to one embodiment, the IPS logic 210 comprises IP defragmentation logic 300, TCP proxy logic 305 and 325, optional cryptographic logic 310 and 320, a switch 315, protocol decoder 245, matching logic 246, action logic 250 and/or the CnC recovery logic 215. The CnC recovery logic 215 comprises malware protocol decoder logic 252 and malware database 253.

Herein, packets associated with incoming network traffic from an external source (e.g., a server) are received by IP defragmentation logic 300, which is responsible for reassembling fragmented packets received over a network. More specifically, for IP-based communications for example, a data packet exceeding a maximum size constraint may be fragmented into smaller pieces and included as payload within a series of IP packets. Hence, upon receipt of web network traffic, the IP packets are defragmented to recover the data in its entirety. Of course, the IP defragmentation logic 300 may conduct different defragmentation operations, based on whether the IP packets are assembled in accordance with IPv4 or IPv6 protocols.

Operating in combination with the IP defragmentation logic 300, the reassembled data packet is provided to TCP proxy logic 305, which is at least responsible for packet re-ordering. For instance, the TCP proxy logic 305 may be configured to reorder the reassembled packets that are out-of-order and resolve overlapping reassembled packets.

Where the network traffic is encrypted, such as through a secure socket layer (SSL), the IPS logic 210 comprises cryptographic logic 310 that may be configured to operate similar to a SSL termination proxy by decrypting and passing the decrypted data to the protocol decoder logic 245. The protocol decoder logic 245 parses the decrypted data packets. For example, for HTTP packets, the protocol decoder logic 245 analyzes the HTTP headers associated with these HTTP packets, and thereafter, saves information associated with the HTTP headers. The saved information associated with the HTTP headers may undergo normalization, such as format conversion, to generate results that are compatible in format with the callback rules and/or signatures.

The matching logic 246 conducts a comparison of the normalized results with the callback rules (and/or signatures) to determine if a malicious callback-based attack has occurred. The "callback check information," namely the callback rules and/or callback signatures, is dynamically uploaded by the dynamic analysis engine into a data store accessible by the matching logic 246.

If a match has not been detected, which normally occurs when malicious callback malware is initially loaded (as detection of callback malware and generation of associated callback check information typically occurs after VM-based processing of the network traffic), the action logic 250 allows the data packets to flow to cryptographic logic 320, which re-encrypts the data and routes the re-encrypted data to TCP proxy logic 325. Operating with cryptographic logic 320, the TCP proxy logic 325 places the re-encrypted data as payload and formulates one or more new TCP packets, which may further include setting corresponding sequence numbers, acknowledge numbers, or the like.

Figure 4:
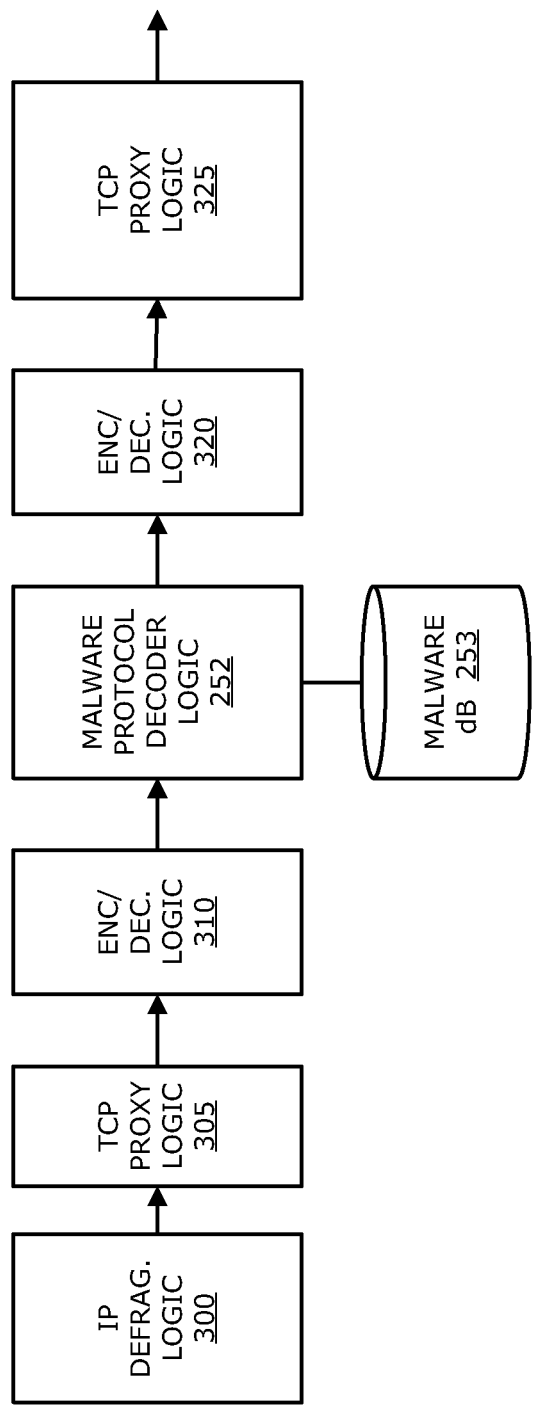
FIG. 4 is an exemplary block diagram of an operation flow for the IPS logic of FIG. 2C with Command and Control (CnC) Recovery logic being activated.

Subsequently, in response to a callback message, such as a HTTP GET message for example, objects associated with the callback message (e.g., certain portions of the callback message, the entire callback message, etc.) undergo the same operations as described above, until receipt by the matching logic 246. The matching logic 246 determines that content associated with the HTTP GET message matches callback check information and thus, the HTTP GET message is from a compromised endpoint device and is considered to be part of a malicious callback-based attack. Such detection prompts the action logic 250 to set switch 315 so that subsequent communications during this communication session, namely a HTTP response message from the CnC server, is routed through the malware protocol decoder logic 252 in lieu of the protocol decoder logic 245 and action logic 250 as shown in FIG. 4.

The malware protocol decoder logic 252 is responsible for parsing received packets to determine a protocol state based on the current message from the one or more messages between the compromised endpoint device and the CnC server (not shown). Upon detecting that the received packets are directed to a command or code update message from the CnC server, the malware protocol decoder logic 252 determines a "neutralized" version of that object (e.g., what particular additional command or code update is requested by callback malware loaded in the OS or application). If a neutralized version of the object is stored within the malware database 253, where uploaded based on internal operations within the security network device or external operations (e.g., third party generated, forensic analysis results, etc.), the malware protocol decoder logic accesses the malware database 253 to retrieve the "neutralized" version and substitutes the object with the neutralized version before forwarding the modified HTTP response message to the compromised endpoint device. If the object is not recognized, the malware protocol decoder logic 252 may be configured to drop the HTTP response message.

Figure 5:
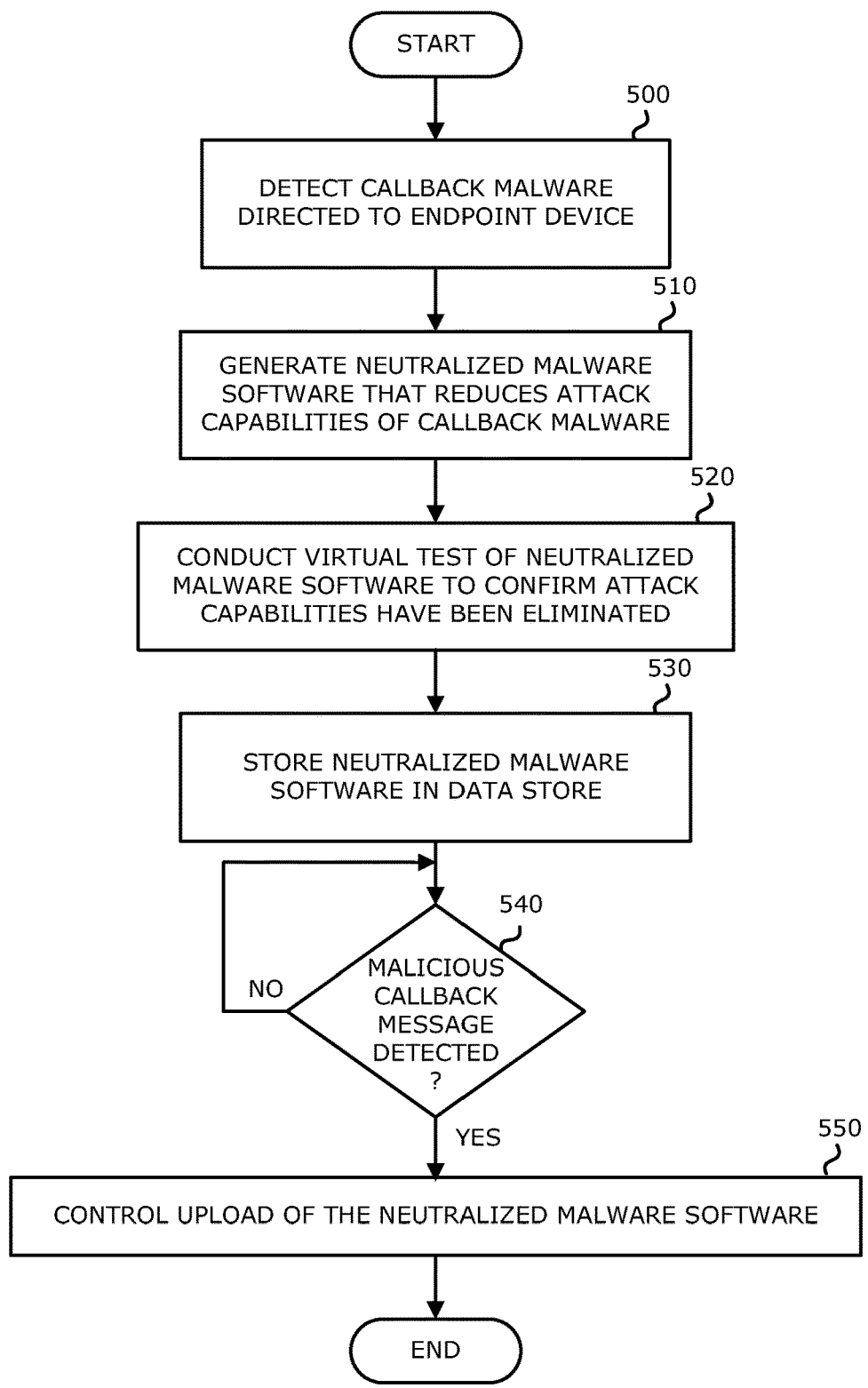
FIG. 5 is a general exemplary flowchart illustrating an updating of the malware database with neutralized (malware) software.

Referring to FIG. 5, a general exemplary flowchart illustrating an updating of the malware database with neutralized (malware) software is shown. Herein, the dynamic analysis engine detects callback malware directed to a particular endpoint device (block 500). Thereafter, neutralized malware software is generated, where the software appears to be an upgrade but is code that reduces (e.g., eliminate or mitigates) attack capabilities of the callback malware (block 510). As an optional feature, the generated neutralized malware software may undergo virtual testing by one or more VMs within the dynamic analysis engine to confirm that the attack capabilities have been eliminated (block 520). After generation, the neutralized malware software is stored in a data store (e.g., malware database 253 of FIG. 3) accessible by malware protocol decoder logic (block 530). In response to detecting a malicious callback message initiate by the callback malware, normally through content of the callback message matches callback check information (e.g., violating a pre-stored callback rule and/or matching a pre-stored callback signature) as described above, the CnC recovery logic is activated to control an upload of the neutralized malware software into the compromised endpoint device (blocks 540 and 550).

Figure 6:
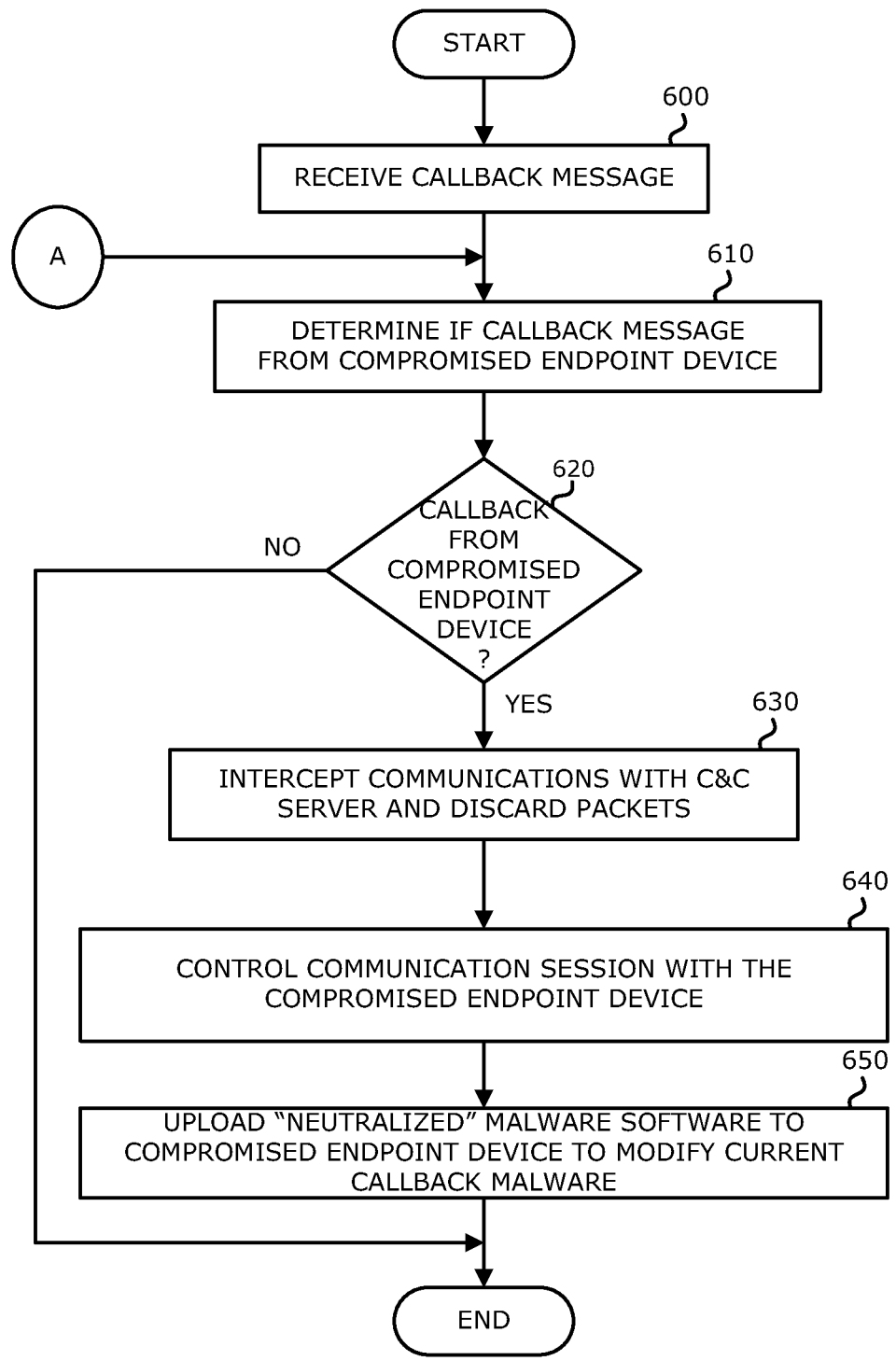
FIG. 6 is an exemplary flowchart illustrating operations associated with activating the CnC recovery logic in order to "neutralize" callback malware.

Referring now to FIG. 6, an exemplary flowchart illustrating operations associated with activating the CnC recovery logic in order to "neutralize" callback malware is shown. Herein, upon receipt of a callback message, an analysis is conducted if the callback message is from a compromised endpoint device (blocks 600 and 610). This analysis may be accomplished by matching content associated with the callback message with callback check information. In particular, the analysis may involve determining whether the content associated with the callback message violates one or more callback rules (or matches a callback signature) that identify certain patterns with respect to content, message formatting and/or communications protocols that have been previously determined to be malicious. Alternatively, the determination may be accomplished by maintaining a blacklist of endpoint devices that have received network traffic including malware and the malware has not been remediated yet.

Upon detecting the callback from the compromised endpoint device, the CnC recovery logic is activated in which communications from the CnC server targeted by the callback message are intercepted (block 630). Furthermore, the CnC recovery logic controls the flows associated with this communication session with the compromised endpoint device, where additional flows may be communicated between the CnC recovery logic and the compromised endpoint device until the compromised endpoint device is placed into a state where it is awaiting update code. At this time, the CnC recovery logic is able to download "neutralized" software that is representative of the update code for receipt by the compromised endpoint device, where the neutralized software may modify a portion of the callback malware (blocks 640 and 650). As described above, the neutralized software is adapted to mitigate or eliminate malicious operability of the callback malware through any number of measures (e.g., disable callbacks, redirect callbacks, delay callbacks, etc.).

Figure 7:
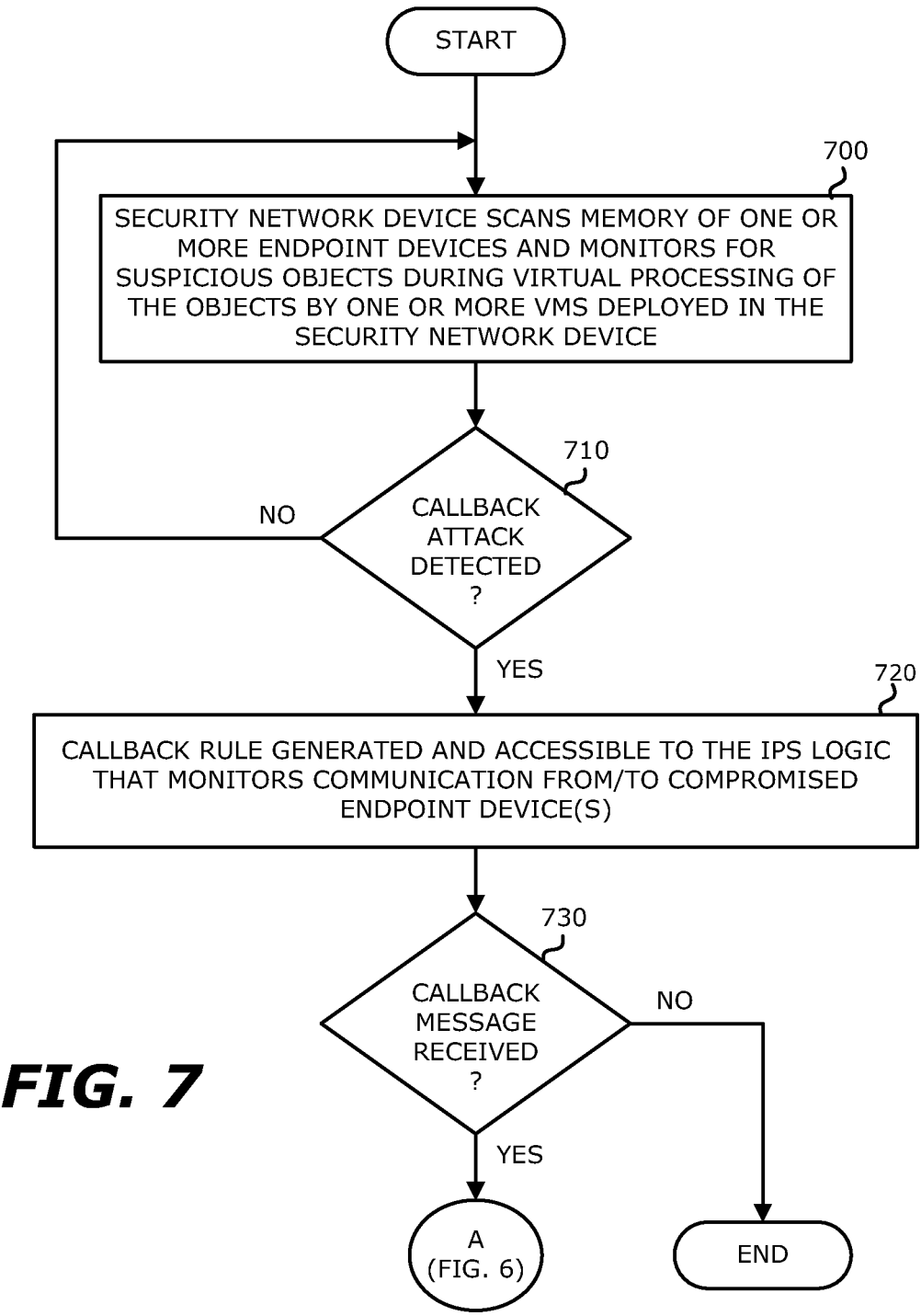
FIG. 7 is an exemplary flowchart of a scan of memory associated with one or more endpoints to detect callback malware and populate the malware database with additional callback rules.

Referring now to FIG. 7, an exemplary flowchart of a scan of memory associated with one or more endpoints to detect callback malware and populate the malware database with additional callback rules is shown. Herein, the security network device may be configured to scan memory of one or more endpoint devices to receive contents therefrom and determine whether the contents include suspicious objects. This may be accomplished by performing static analysis on the contents. Thereafter, the suspicious objects undergo virtual processing, where behaviors of the VMs are monitored (block 700).

In response to detection of a callback-based attack during the virtual processing, the dynamic analysis engine generates one or more callback rules and/or callback signatures that are accessible by the IPS logic, which monitors network traffic for the presence of callback messages from a compromised endpoint device (blocks 710 and 720). In response to detecting a subsequent callback message, the operations of blocks 610-650 are conducted to upload neutralized software to overwrite the callback malware (block 730).

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method, comprising:
   intercepting an incoming message from a remote source directed to an endpoint device, the incoming message is in response to a callback message sent from malware operating on the endpoint device;

overwriting a first portion of information within the incoming message with a second portion of information including a neutralized version of at least a portion of the malware and the second portion of information includes at least (a) a callback identifier including an address of a destination device operating as a Command and Control (CnC) server or (b) a callback time used by the malware to determine when to attempt a subsequent communication with the destination device; and forwarding the incoming message including the second portion of the information to the endpoint device.

2. The computerized method of claim 1, wherein prior to intercepting the incoming message, the method further comprises;

determining whether a portion of the incoming message matches a callback signature, the callback signature generated in response to a prior detection of the malware within an object associated with monitored network traffic.

3. The computerized method of claim 2, wherein the prior detection of the malware comprises detecting one or more anomalous behaviors indicative of the malware during execution of a second object associated with the monitored network traffic and different from the object within a virtual machine, the malware attempting an outbound communications to the destination device operating as the CnC server in accordance with a single phase attack or a multi-phase attack.

4. The computerized method of claim 1, wherein prior to intercepting the incoming message, the method further comprises:

determining whether a portion of the incoming message violates at least one callback rule, the callback rule being generated in response to a prior detection of the malware within an object associated with monitored network traffic.

5. The computerized method of claim 1, wherein prior to the overwriting of the first portion of information with the second portion of information including the neutralized version, the method further comprises accessing a data store based on the identified malware and determining whether the data store includes the neutralized version.

6. The computerized method of claim 1, wherein the malware becomes inoperable upon modifying the portion of the malware with the neutralized version of at least the portion of the malware.

7. The computerized method of claim 1, wherein the identifier of the destination device comprises a callback phone number of the destination device.

8. The computerized method of claim 1, wherein the overwriting of the first portion of information with the second portion of information
causes a reset of a callback time being used by the malware to determine when to attempt the subsequent communication with the CnC server.

9. The computerized method of claim 1, wherein the overwriting of the first portion of information with the second portion of information further comprises:

determining whether the incoming message is a command from the CnC server causing the compromised endpoint device to evade detection.

10. The computerized method of claim 1, wherein the overwriting of the first portion of information with the second portion of information further comprises:

determining whether the incoming message is a code update from the CnC server causing the compromised endpoint device to attempt to exfiltrate sensitive information.

11. The computerized method of claim 1, wherein the forwarding of the incoming message comprises:

modifying at least the portion of the malware with the second portion of the information being information that, when processed, mitigates operability of the malware.

12. The computerized method of claim 1, wherein the forwarding of the incoming message comprises:

modifying at least the portion of the malware with the second portion of the information being information that, when processed, causes the malware to become inoperable.

13. The computerized method of claim 1, wherein the intercepting of the incoming message, the overwriting of the first portion of information, and forwarding of the incoming message are conducted by an intrusion protection system (IPS) logic.

14. The computerized method of claim 2, wherein upon determining whether the portion of the incoming message matches the callback signature by logic within an intrusion protection system, a first grouping of logic within the intrusion protection system becomes inactive and a second grouping of logic within the intrusion protection system becomes active, the second grouping of logic performs functionality of intercepting the incoming message, overwriting the first portion of information, and forwarding of the incoming message.

15. The computerized method of claim 14, wherein the second grouping of logic includes a malware protocol decoder logic being accessible to a data store.

16. The computerized method of claim 1, wherein the address of the destination device includes an Internet Protocol (IP) address of the destination device.

17. A computerized method comprising:

scanning memory of an endpoint device;

performing virtual analysis on information obtained from the scanned memory to (1) determine whether the information is malware and (2) generate callback check information corresponding to the malware;

in response to a malicious callback session being detected based on the callback check information,
intercepting an incoming message directed to the endpoint device, the incoming message being a response to a callback message from the endpoint device,
substituting a first portion of information within the incoming message with a second portion of information, the second portion of information includes a code update that, when transmitted to the endpoint device, is configured to overwrite at least a portion of the malware at the endpoint device to mitigate operability of the malware by disrupting subsequent communication between the malware and a Command and Control (CnC) server, and
providing the incoming message including the second portion of the information to the endpoint device,
wherein the substituting of the first portion of information within the incoming message with the second portion of information comprises overwriting the first portion of information with the second portion of information changing either (i) a callback identifier including at least an address of the CnC server to preclude the subsequent communication to the CnC server or (ii) a callback time used by the malware to determine when to attempt the subsequent communication with the CnC server.

18. The computerized method of claim 17, wherein the address of the destination device includes an Internet Protocol (IP) address of the destination device.

19. A system comprising:
one or more hardware processors; and
a non-transitory storage medium comprises:
  interface logic to receive an incoming message from a remote source directed to an endpoint device in response to the endpoint device being previously detected as including a malware by detecting a callback message being sent from the endpoint device and the incoming message is in response to the callback message; and
  a first analysis engine in communication with the interface logic, the first analysis engine to (i) intercept the incoming message, (ii) overwrite a first portion of information within the incoming message with a second portion of information including a neutralized version of at least a portion of the malware where the second portion of information includes at least (a) a callback identifier including an address of a destination device operating as a Command and Control (CnC) server or (b) a callback time used by the malware to determine when to attempt a subsequent communication with the destination device, and (iii) provide the incoming message including the second portion of the information to the endpoint device.

20. The system of claim 19, wherein the first analysis engine is logic within an intrusion prevention system (IPS) device.

21. The system of claim 19, wherein the first analysis engine intercepts the incoming message by extracting one or more objects from the incoming message and determining whether the one or more object matches callback check information corresponding to the malware.

22. The system of claim 21, further comprising a second analysis engine, prior to receipt of the incoming message by the system, detecting one or more anomalous behaviors indicative of the malware during virtual execution of an object associated with network traffic within a virtual machine and generates the callback check information based on detection of the malware.

23. The system of claim 19, wherein the first analysis engine, prior to overwriting of the first portion of information with the second portion of information including the neutralized version including code to overwrite at least part of the malware, further accesses a data store based on the identified malware and determines whether the data store includes the neutralized version.

24. The system of claim 19, wherein the first analysis engine returns the neutralized version of at least the portion of the malware to the endpoint device to modify the malware and cause the malware to become inoperable.

25. The system of claim 19, wherein the first analysis engine to overwrite the first portion of information with the second portion of the information that, when the second portion of the information of the incoming message is installed on the endpoint device, resets a callback time used by the malware to determine when to attempt the subsequent communication with the CnC server.

26. The system of claim 19, wherein the address of the destination device includes an Internet Protocol (IP) address of the destination device.

* * * * *